US009968869B2

(12) United States Patent
Volkel et al.

(10) Patent No.: US 9,968,869 B2
(45) Date of Patent: May 15, 2018

(54) HYDRODYNAMIC SEPARATION USING HIGH ASPECT RATIO CHANNELS

(71) Applicant: Palo Alto Research Center Incorporated, Palo Alto, CA (US)

(72) Inventors: Armin R. Volkel, Mountain View, CA (US); John S. Paschkewitz, San Carlos, CA (US); Huangpin B. Hsieh, Palo Alto, CA (US); Kai Melde, Stuttgart (DE)

(73) Assignee: Palo Alto Research Center Incorporated, Palo Alto, CA (US)

( * ) Notice: Subject to any disclaimer, the term of this patent is extended or adjusted under 35 U.S.C. 154(b) by 326 days.

(21) Appl. No.: 14/303,957

(22) Filed: Jun. 13, 2014

(65) Prior Publication Data

US 2014/0367349 A1 Dec. 18, 2014

Related U.S. Application Data

(60) Provisional application No. 61/835,490, filed on Jun. 14, 2013.

(51) Int. Cl.
*B01D 21/26* (2006.01)
*B01D 21/34* (2006.01)

(52) U.S. Cl.
CPC ............ *B01D 21/265* (2013.01); *B01D 21/34* (2013.01)

(58) Field of Classification Search
CPC .............................. B01D 21/265; B01D 21/34
See application file for complete search history.

(56) References Cited

U.S. PATENT DOCUMENTS

| 5,204,002 A | 4/1993 | Belfort et al. |
| 5,626,758 A | 5/1997 | Belfort |
| 8,120,770 B2 | 2/2012 | Huang et al. |
| 2009/0114607 A1 | 5/2009 | Lean et al. |
| 2010/0314263 A1 | 12/2010 | Lean et al. |

OTHER PUBLICATIONS

Guofeng Guan et al., "Spiral microchannel with rectangular and trapezoidal cross-sections for size based particle separation," Scientific Reports, 3:1475, pp. 1-9, published Mar. 18, 2013.
Jeonggi Seo et al., "Membraneless microseparation by asymmetry in curvilinear laminar flows," Science Direct, Journal of Chromatography A 1162, pp. 126-131, 2007.
International Search Report for PCT/US14/42274 dated Oct. 20, 2014.

*Primary Examiner* — David A Reifsnyder
(74) *Attorney, Agent, or Firm* — Fay Sharpe LLP

(57) ABSTRACT

A Hydrodynamic separation device using curved channels is provided. High aspect ratio channels improve the focusing dynamics of the hydrodynamic separator and leads to improved channel design choices.

14 Claims, 13 Drawing Sheets

CHANNEL CROSS SECTION WITH A STACKED PAIR OF DEAN VORTICES

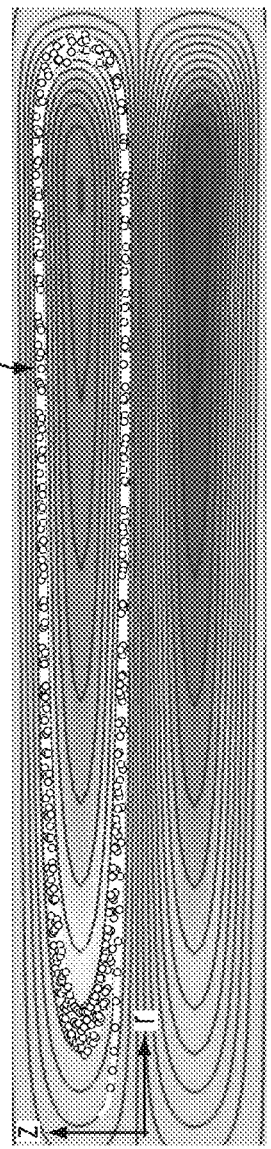 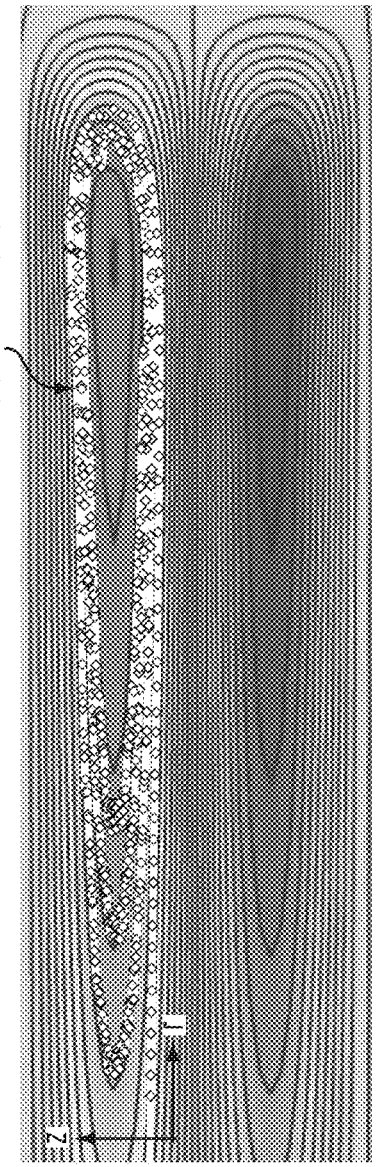

HYDRODYNAMIC SEPARATION USING HIGH ASPECT RATIO CHANNELS

INCORPORATION BY REFERENCE

This application claims priority to and is based on U.S. Provisional Application No. 61/835,490, filed on Jun. 14, 2013, which is incorporated herein by reference in its entirety.

BACKGROUND

Separation of particles from a fluid without the use of a physical barrier has many advantages. The ability to separate neutrally buoyant particles from a fluid without a barrier and/or the addition of chemicals or other particles is even better. Hydrodynamic separation (HDS), which utilizes the specific flow patterns in a curved channel for particle concentration and separation, has proven to be such a technology.

BRIEF DESCRIPTION

In one aspect of the presently described embodiments, a hydrodynamic separation device comprises an inlet for fluid containing particles, a curved channel having a width and height and being configured to receive the fluid such that at least one pair of Dean vortices is formed in the fluid, wherein interactions with flow patterns causes particles to form a concentrated band near an outer wall of the channel, wherein the flow is adjusted such that the Dean number in the channel is between 30 and 100, and further wherein a ratio of the width to the height of the channel is at least 7, and, an outlet configured to allow the concentrated stream to exit the channel on a first path and remaining fluid to exit the channel on a second path.

In another aspect of the presently described embodiments, the aspect ratio is 7.5.

In another aspect of the presently described embodiments, the aspect ratio is 15.

In another aspect of the presently described embodiments, the aspect ratio is between 8 and 15, or at least 15.

In another aspect of the presently described embodiments, the flow rate is adjusted such that the Dean number inside the channel is between 60 and 80.

In another aspect of the presently described embodiments, a method for hydrodynamic separation comprises receiving fluid containing particles in a curved channel having a width and height, wherein a ratio of the width to the height of the channel is at least 7, controlling fluid flow such that at least one pair of Dean vortices is formed in the fluid, wherein interaction with flow patterns causes particles to form a concentrated band near an outer wall of the channel where they are carried to an outlet configured to allow the concentrated stream to exit the channel on a first path and remaining fluid to exit the channel on a second path, and wherein the flow is adjusted such that the Dean number inside the channel is between 30 and 100.

In another aspect of the presently described embodiments, the aspect ratio is 7.5.

In another aspect of the presently described embodiments, the aspect ratio is 15, or at least 15.

In another aspect of the presently described embodiments, the aspect ratio is between 8 and 15.

In another aspect of the presently described embodiments, the flow rate is adjusted such that the Dean number inside the channel is between 60 and 80.

BRIEF DESCRIPTION OF THE DRAWINGS

FIGS. 3a and 3b show a cross section of a channel;

DETAILED DESCRIPTION

Hydrodynamic separation (HDS) of suspended particles using curved channels offers advantages in many applications. It is a fast continuous flow technology that can handle particles, including neutrally and near neutrally buoyant particles, without the need of a physical barrier or the addition of chemical aids. To get the best benefit for a specific application, it is important to understand the design parameters that control cut-off size, flow rate, pressure drop, etc. The presently described embodiments relate to the role of the channel aspect ratio on the focusing dynamics of the hydrodynamic separator and how it leads to improved channel design choices.

It should be appreciated that any of the various embodiments or designs contemplated herein, or combinations of such embodiments or designs, may be implemented in any single device or system, or in a plurality of devices or systems.

Figure 1A:
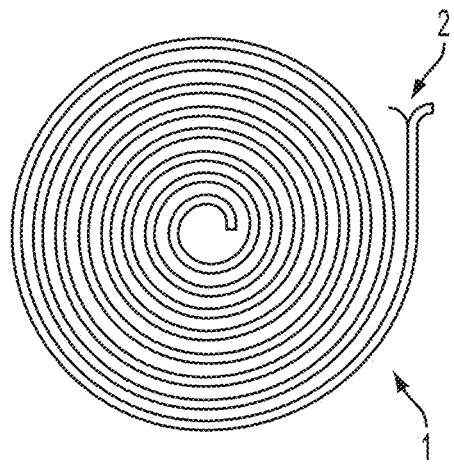
FIGS. 1a-d are examples of environments into which the presently described embodiments may be implemented.
Figure 1B:
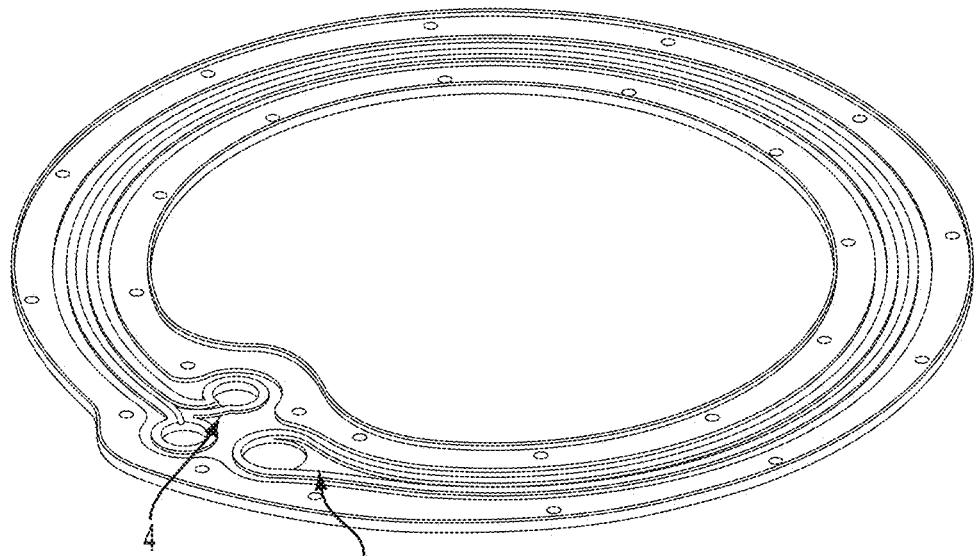
Figure 1C:
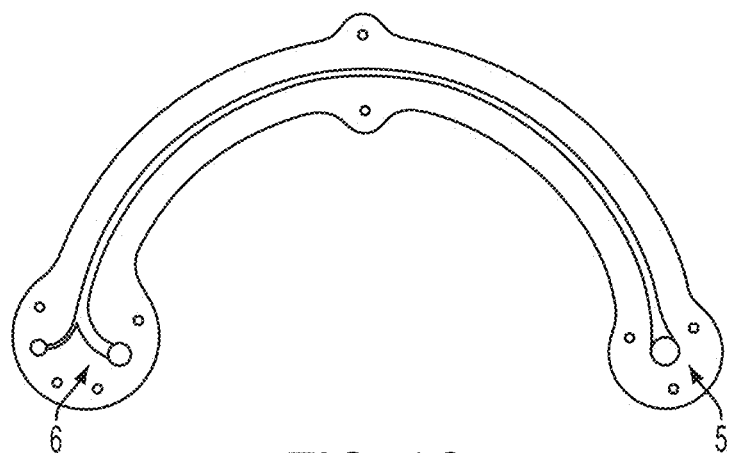
Figure 1D:
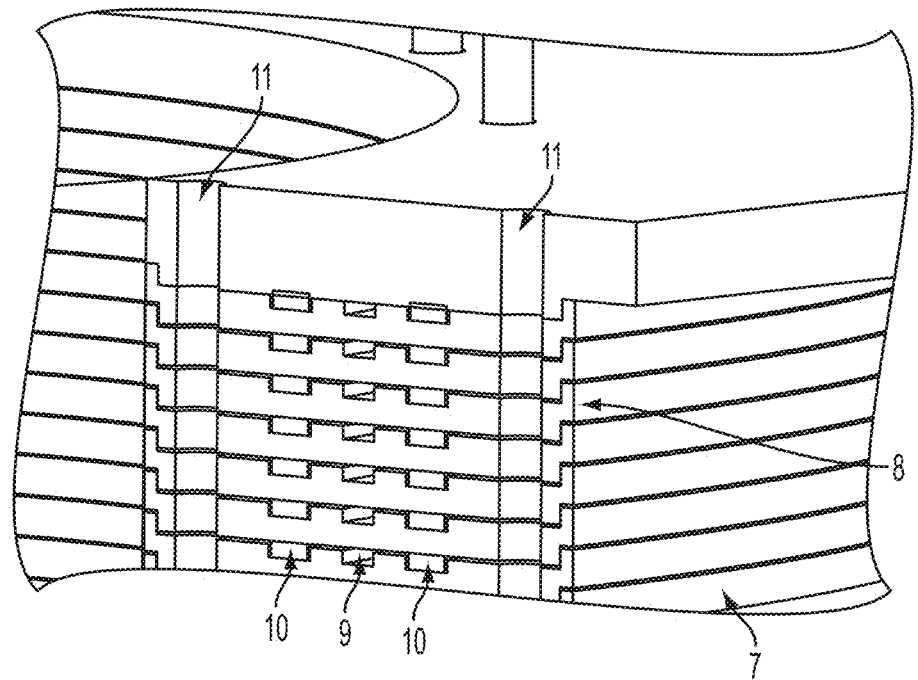

Further, the examples according to the presently described embodiments illustrate example designs in example operational scenarios that improve HDS separation efficiency for selected implementations. Of course, it should be appreciated that such examples may also include a variety of different configurations of curved channel devices that utilize various hydrodynamic forces, some of which are described above and hereinafter, to separate particles into portions of the field flow and/or bands of particles for purposes of separation. Examples of such curved channel HDS devices (or portions thereof) are illustrated in FIGS. 1a through 1d. FIG. 1a shows a representative view of a curved channel device 1 taking the form of an example single channel, spiral device that includes multiple turns. The device 1 has an outlet region 2. FIG. 1b shows a curved device 3 having a single channel, full turn configuration where the channel spans between 180 degrees and 360 degrees (e.g. close to 360 degrees as shown). The device 3 has an outlet region 4. FIG. 1c illustrates a curved device 5 having a single channel and a half turn configuration. The device 5 has an outlet region 6. FIG. 1d shows a stack 7 of a plurality of curved devices 8. Also shown are a channel 9, gaskets or sealing elements 10, and apertures 11.

It should be appreciated that such devices (e.g. those shown in FIGS. 1a through 1d) may be incorporated in a system for separating particles in fluid (e.g. liquid). Such a system may include control elements (e.g. control modules, processors, actuators, sensors, . . . etc.) to control the flow of the fluid to achieve the contemplated separation in the system.

Notably, the channel such as that shown at 9 of FIG. 1d may typically take a variety of forms—some of which are shown. However, according to the presently described embodiments, the channel is configured to have a high aspect ratio A (equal to width/height of the channel). Further, the system incorporating such a high aspect ratio channel may be operated to achieve advantageous results as described hereinafter.

Figure 2:
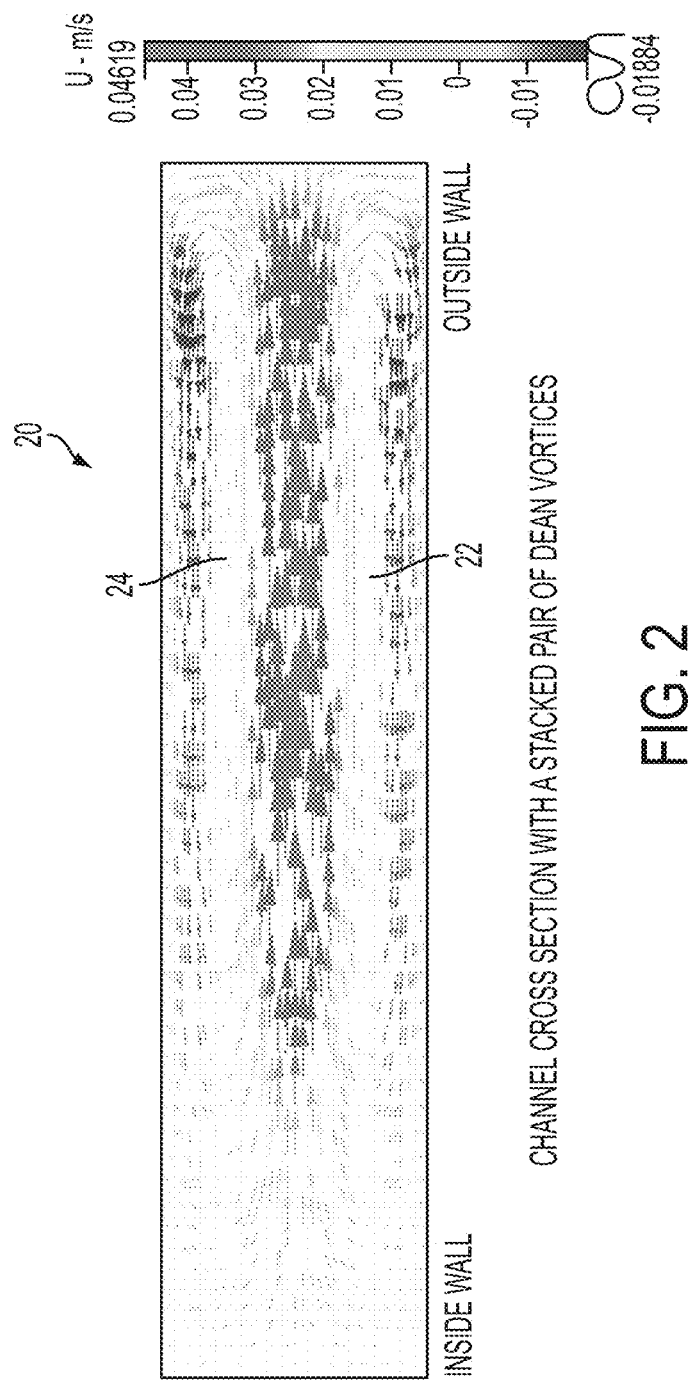
FIG. 2 shows a cross section of a channel

Referring now to FIG. 2, because of the generation of centrifugal forces on the fluid or liquid flowing through the channel in certain circumstances, transverse flow patterns emerge. Under certain flow conditions and geometrical constraints, these transverse flow patterns emerge as a pair of Dean vortices. As shown, a fully developed Dean vortex pair 22, 24 in the cross-sectional plane of a curved channel 20. Particles entrained in such a flow are spiraling around these vortex cores as they move along the channel. In certain locations, a combination of shear and inertia forces push the particles closer to the vortex centers, causing a dynamic focusing of the particles into a band around the vortex cores.

To illustrate, with reference to FIGS. 3a and 3b, because of size dependence of the lift forces, only particles exceeding a certain size (which depends on the channel geometry and flow rate) are affected enough to become part of the concentrated band. FIGS. 3a and 3b show a projection of particle trajectories on a cross-sectional area of a curved channel 30 with A=4.55. The solid lines indicate projections of streamlines onto the same cross-sectional area. The particles are not shown to scale, only representatively for ease of illustration. As shown in FIG. 3a, a 20 micron particle is barely affected by the shear and inertia forces and closely follows the stream lines. No focusing effect is visible. However, as shown in FIG. 3b, a 70 micron particle experiences stronger shear and inertia forces near the outside wall, where it crosses streamlines towards the Dean vortex core. There is dynamic focusing toward the vortex core.

Figure 4:
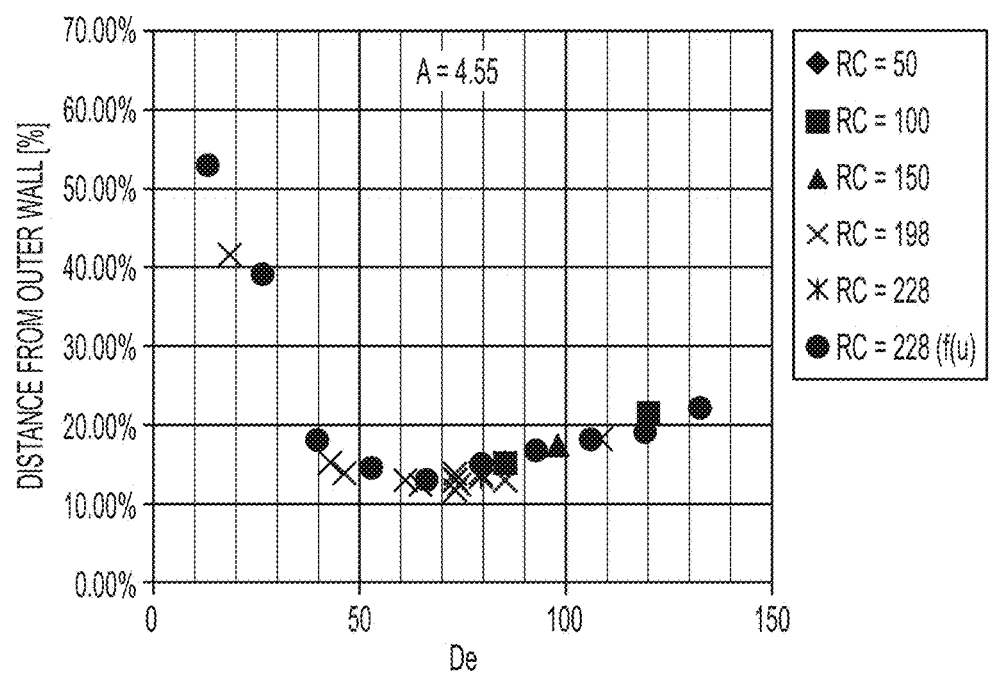
FIGS. 4, 5 and 7 show Computation Fluidic Dynamics (CFD) simulation results.

In low aspect ratio (A=width/height) channels, focusing is dynamic, i.e. for each complete loop the particle goes around a vortex center it is pushed a bit closer to the vortex center. FIGS. 3a and 3b describes the observed physics in channels with not too large an aspect ratio (e.g. Ookawara, D. Street, K. Ogawa, *Chem. Eng. Sci.*, 61, 3714-3724, (2006)) (A=4/3 or 1.33), H. B. Hsieh, A. R. Völkel, N. E. Chang, A. Kole, K. Melde, F. Torres, *Water Science & Technology—Water Supply*, 13(2), 524-530, (2013) (A=5/1.1 or 4.55)). The flow field in the channels under consideration (D_H<<R_C, where the hydraulic radius D_H is the characteristic length scale of the channel cross-section and R_C is the radius of curvature) is completely described by the Dean number $$De = Re\sqrt{\frac{D_H}{2R_C}} = 2\left(\frac{\bar{v}H}{v}\right)\left(\frac{H}{R_C}\right)^{1/2}(\alpha)^{3/2},$$

which combines the Reynolds number $$Re = \frac{\bar{v}D_H}{v} = \frac{v2\alpha H}{v}$$

with information on the radius of curvature, and $$a = \frac{1}{1 + 1/A}$$

is a function of the aspect ratio A. H is for height of the channel, v is kinematic viscosity, and v is for velocity. For a fixed aspect ratio A, the relative distance of the Dean vortex centers from the outside wall $$d_r = \frac{\text{outside wall location} - \text{Dean vortex location}}{\text{channel width}}$$

falls on a universal curve. FIG. 4 shows $d_r$ as function of Dean number for A=4.55. The different markers are for channels with different radius of curvature RC and varying flow rate (solid circle).

Figure 5:
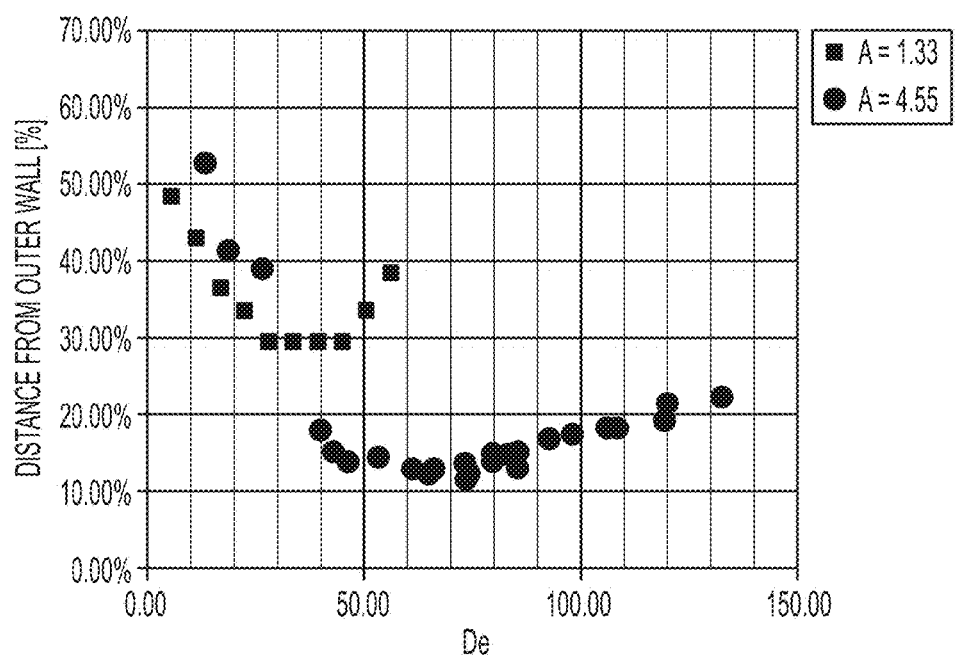

$d_r$ has a well-defined minimum at a finite Dean number, but both the closest distance to the wall, as well as the Dean number for this to happen, are functions of the aspect ratio A. With increasing A, the minimal distance to the outside wall is decreasing and occurs at a larger Dean number. FIG. 5 shows a relative distance $d_r$ of vortex core from outer wall as function of Dean number. The different markers are for channels with two different aspect ratios A.

When using the curved channel as a separator and/or concentrator of suspended particles by placing a flow splitter at the exit, it is advantageous to have the particle band forming as close to the outside wall as possible to minimize the amount of liquid diverted with the particle stream at the flow splitter. In other words, the closer the particle bands can form relative to the outside wall, the higher the split ratio can be achieved. In the case described by Ookawara (A=1.33), a 50:50 flow split is required to achieve any reasonable particle separation. At the higher aspect ratio described by Hsieh et al (A=4.55), a 70:30 clean stream to concentrate stream flow split achieves reasonable separation. Besides its impact on the band location, the aspect ratio also provides a control parameter for the flow rate of the liquid and/or the radius of curvature of the channel, hence allowing the optimization of channel geometries for specific applications.

High aspect ratio channels allow for different results. In one form, once the aspect ratio exceeds about 7, the particle focusing dynamics changes. That is, in at least one form, any particle that is carried for the first time close to the outside wall will remain there, i.e. the final band forms within the first loop of the particles around the Dean vortex center. Of course, the aspect ratio may vary. For example, in some forms, it may be 7.5, 8, 15 or any value between 7.5 and 15, such as between 8 and 15. It may exceed 15. In at least some forms, any aspect ratio exceeding a value of about 7 is acceptable. Also, the Dean Number may vary. In at least one form, the flow is adjusted such that the Dean Number is between 30 and 100 inside the channel. In some other forms, flow may be adjusted such that the Dean Number is between 60 and 80 inside the channel.

Figure 6A:
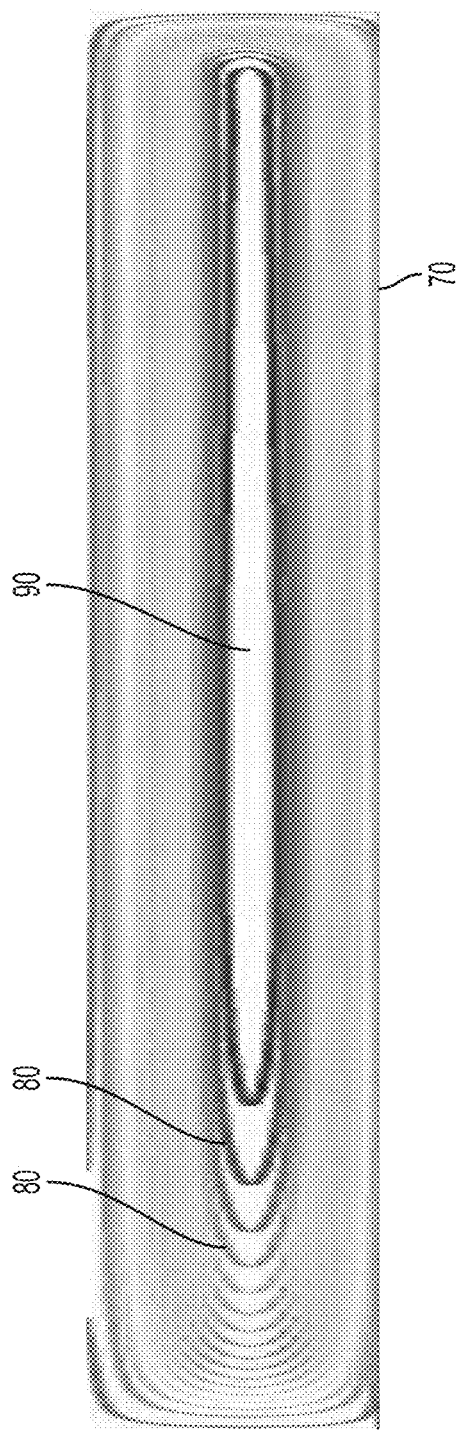
FIGS. 6a and 6b show a cross section of a channel according to the presently described embodiments.
Figure 6B:
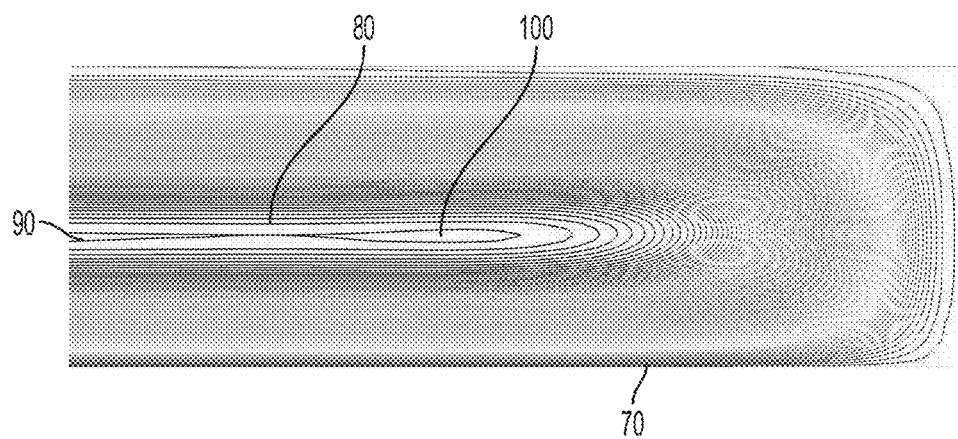
Figure 7:
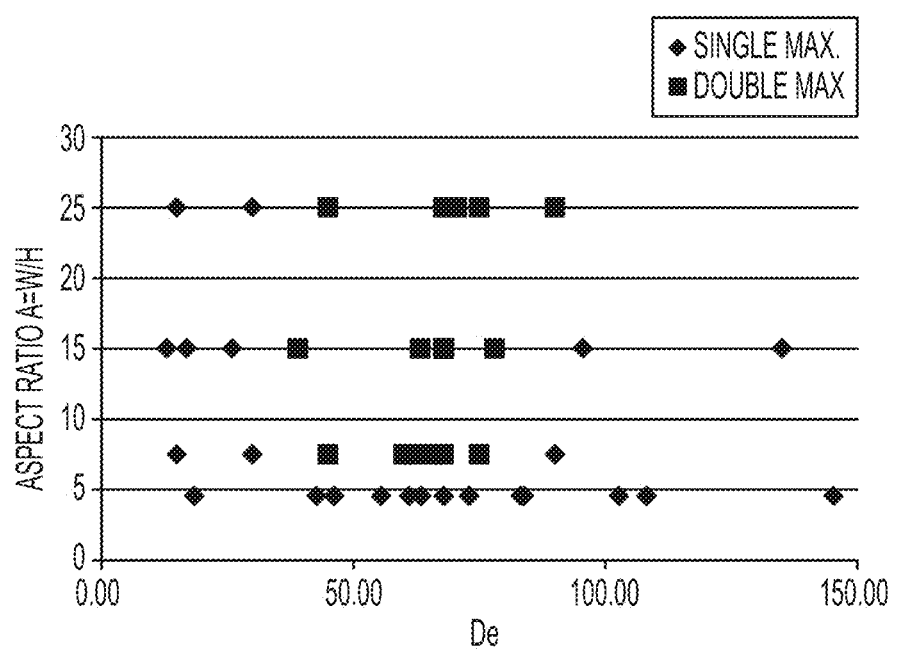

This change in particle focusing behavior is accompanied by additional maxima in the transverse vorticity, which can be seen for example by a second set of closed loops when projecting streamlines on a channel cross section: FIG. 6a (as well as FIGS. 3a and 3b for low aspect ratio channels) show the loops formed by streamlines circling around the main vortex core. FIG. 6b shows additional closed loops of stream lines close to the outside wall, which only appear for large enough aspect ratios (i.e. A exceeding 7). In this regard, besides the vorticity maxima at the two Dean vortex cores (as shown in FIGS. 2, 3a and 3b), 2 additional maxima appear near the outside wall. FIG. 7 shows the occurrence of these additional maxima in the transverse vorticity as a function of Dean number and aspect ratio. Once the aspect ratio exceeds about 7, there is a wide range of De numbers for which these additional vorticity maxima exist and a narrow particle band near the outside wall forms. As shown, the number of maxima of the transverse vorticity component (per half channel) as a function of Dean number and aspect ratio. Diamond markers indicate single maximum, and rectangle markers represent double maxima.

To illustrate, with reference now to FIGS. 6a and 6b, a high aspect ratio channel 70 with streamlines 80 is illustrated. In FIG. 6a, a half-channel view is shown for ease of reference and illustrates the formation of the vortex core 90. A magnified view of the right side (e.g. outer channel wall) of FIG. 6a is illustrated in FIG. 6b. In this regard, a second vortex core 100 is apparent—very near the wall. According to the presently described embodiments, this vortex core (and its mated pair—not shown) carries particles in a concentrated band or stream through the channel.

Figure 8:
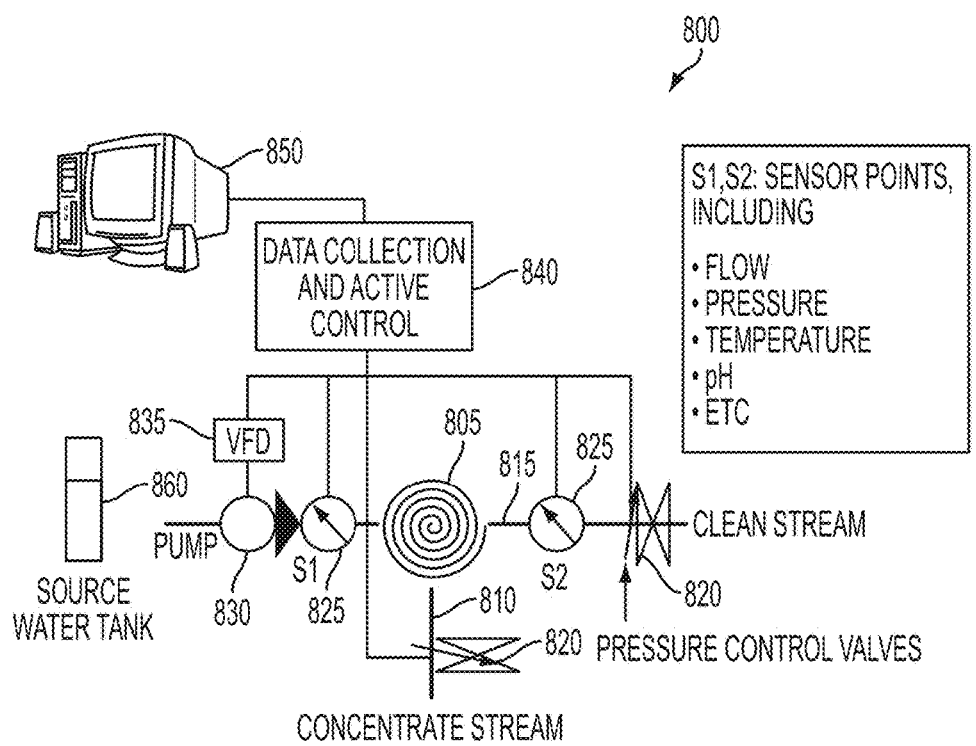
FIG. 8 shows a system according to the presently described embodiments.

As shown in FIG. 8, a system 800 is illustrated. Although the system is shown as a test system, it will be understood that such a system could be adapted for use in the field to control particle separation in various environments. The system 800 includes a curved channel device 805, where the shown spiral is as a mere example representation of a HDS device and may take a variety of forms including those described herein. Also shown are a concentrate stream outlet 810 and a clean or dilute stream outlet 815. Pressure control valves 820 and sensors 825 are also shown in the system. A pump 830 may be used to pump fluid from a source tank 860 into the system, so that fluid having particles is input to the curved channel device 805 for processing according to the presently described embodiments. Further, a variable frequency drive (VFD) for controlling the pump 835, a data collection and active control system 840 and a user interface 850 are illustrated. It should be appreciated that the system 800 may be used to measure a variety of parameters including flow, fluid velocity, pressure, temperature, pH, etc. Knowledge of these parameters allow the control system 840, along with actuators such as the pump 830 and pressure control valves 820, to operate the system at desired conditions according to the presently described embodiments.

In a system of the example of FIG. 8 or a similar system, according to the presently described embodiments, in at least one form, a hydrodynamic separation device is implemented and comprises an inlet for fluid containing particles, a curved channel having a width and height and being configured to receive the fluid such that at least one pair of Dean vortices is formed in the fluid, wherein interaction with flow patterns causes particles to form a concentrated band near an outer wall (e.g. an outer side wall) of the channel, wherein the flow is adjusted such that the Dean number in the channel is between 30 and 100, and further wherein a ratio of the width to the height of the channel is at least 7, and an outlet configured to allow the concentrated stream to exit the channel on a first path and remaining fluid to exit the channel on a second path.

It is to be further appreciated that a system according to the presently described embodiments will facilitate a variety of methods of operation. In at least one form, a method for hydrodynamic separation comprises receiving fluid containing particles in a curved channel having a width and height, wherein a ratio of the width to the height of the channel is at least 7 and controlling fluid flow such that at least one pair of Dean vortices is formed in the fluid, wherein interaction with flow patterns causes particles to form a concentrated band near an outer wall (e.g. outer side wall) of the channel where they are carried to an outlet configured to allow the concentrated stream to exit the channel on a first path and remaining fluid to exit the channel on a second path, and wherein the flow is adjusted such that the Dean number inside the channel is between 30 and 100.

It should also be appreciated that, according to the presently described embodiments, actual device design and operational parameters may vary. However, in at least one form, parameters are listed in Table 1 below:

TABLE 1

HDS device design and operational parameters
Channel dimensions for current prototypes:

| | R_C [mm] | height [mm] | width [mm] | Q [ml/min] | V [m/s] | dP [psi] | dP [kPas] | Pr (5k gpm) [kw] | d_c [micron] |
|---|---|---|---|---|---|---|---|---|---|
| floc separator | 198 | 1.1 | 5 | 200 | 0.61 | 1.3 | 9.9 | 2.8 | 70 |
| 3x floc separator | 198 | 1.1 | 15 | 600 | 0.61 | 1.2 | 9.1 | 2.6 | 70 |
| particle separator | 198 | 0.4 | 6 | 250 | 1.73 | 10/20* | 75.8/151.6 | 21.7/43.5 | 20 |

R_C radius of curvature
Q flow rate at room temperature and water viscosity
V linear velocity of liquid at room temperature and water viscosity
dP pressure drop (single channel) at room temperature and water viscosity
*half turn/full turn
Pr (5k gpm) HDS fluidic-only power requirement for 5,000 gallon per min
d_c estimated cut-off size (>90%)

A "floc separator" is an HDS channel implementation for separating out large (>70 micron) particles at low pressure and shear conditions. A "particle separator" is an HDS channel implementation for concentrating smaller (>20 micron) but compact particles at higher shear rates. The differences are mainly in the channel geometry (width, height) and operational pressure.

Also, operation of a system, such as the one illustrated in FIG. 8, allows for the generation of various data for separated streams, a set of typically generated data is summarized in Table 2 below:

| channel type | TSS [ppm] | | | flow fraction | | recycle rate |
|---|---|---|---|---|---|---|
| | input | concentrate | clean | concentrate | clean | |
| low-aspect ratio (A = 4.55) | 3959 | 9410 | 1630 | 0.30 | 0.70 | 71% |
| low-aspect ratio (A = 4.55) | 3821 | 9163 | 1509 | 0.30 | 0.70 | 72% |
| low-aspect ratio (A = 4.55) | 4047 | 9093 | 1773 | 0.31 | 0.69 | 70% |
| high-aspect ratio (A = 15) | 3895 | 7870 | 592 | 0.45 | 0.55 | 92% |
| high-aspect ratio (A = 15) | 3859 | 7758 | 593 | 0.46 | 0.54 | 92% |
| high-aspect ratio (A = 15) | 5200 | 11821 | 2362 | 0.30 | 0.70 | 68% |

$$\text{recycle rate} = \frac{\text{flow fraction in concentrate} * TSS \text{ concentrate}}{TTS \text{ input}}$$

The data of Table 2 demonstrates similar harvesting efficiencies for the wider channel when operated with the same splitter geometry, even though the input concentration is 25% higher than for the narrower channel experiments (and much better performance, if the flow split is close to 50:50).

Figure 9A:
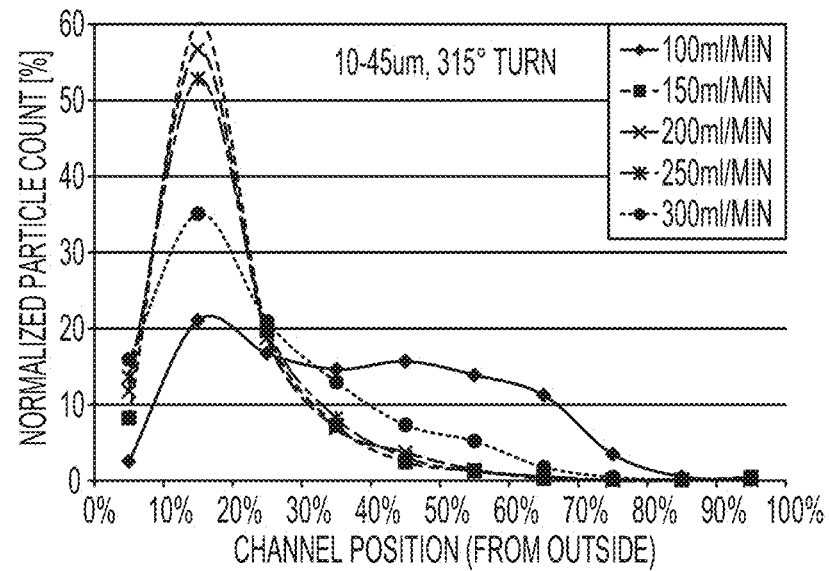
FIGS. 9a, 9b, 10a, and 10b show experimental results.

Other experimental results are illustrated in FIGS. 9a through 10.

Figure 9B:
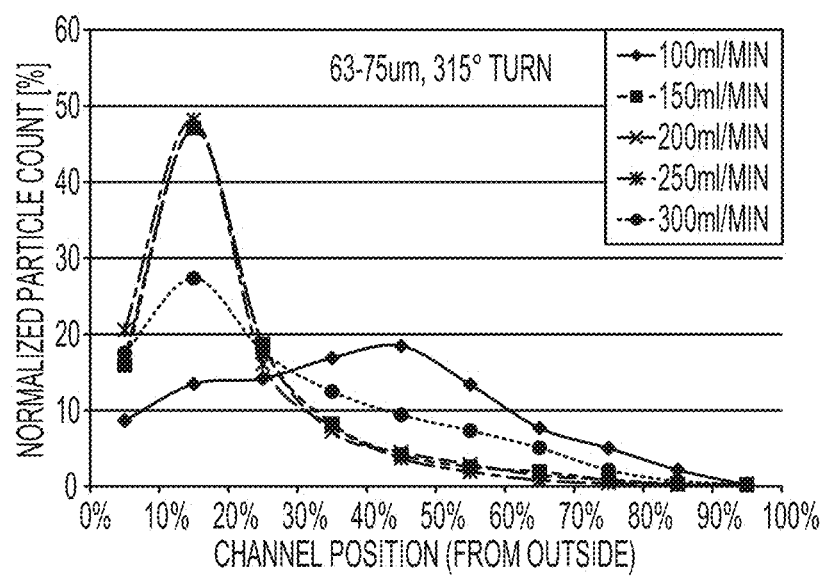

In FIGS. 9a and 9b, particle band formation in a full-turn channel (315 deg arc length) with aspect ratio A=15 at different flow rates is shown. The corresponding Dean number spans a range from 23 to 68. The plots show normalized particle counts as function of distance from the outside wall (in %). The particle counts have been achieved, by counting fluorescent particles as they pass by a laser-illuminated slit across the channel width. For a wide flow rate range (150 to 250 ml/min) a well-defined particle band is visible near the outside wall. At higher flow rates (300 ml/min) this band starts to broaden, while at lower flow rates (100 ml/min) no band is visible at all.

Figure 10A:
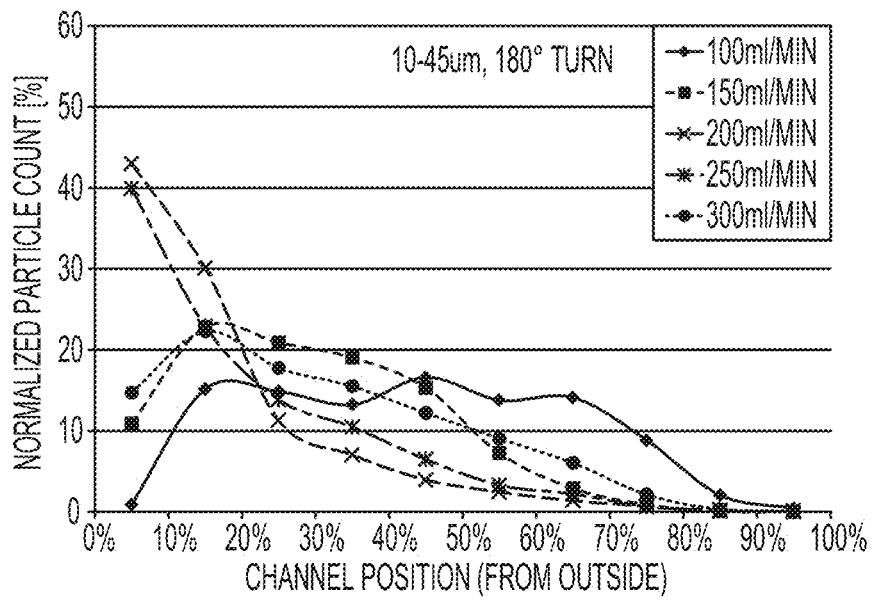
Figure 10B:
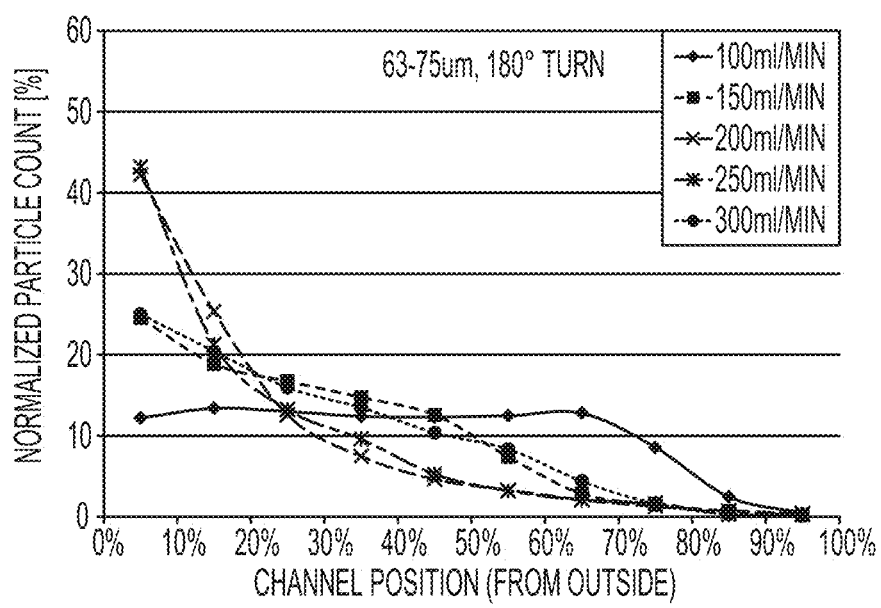

In FIGS. 10a and 10b, particle band formation in half-turn channel (180 deg arc length) with aspect ratio A=15 at different flow rates is shown. The corresponding Dean number spans a range from 23 to 68.

Figure 11:
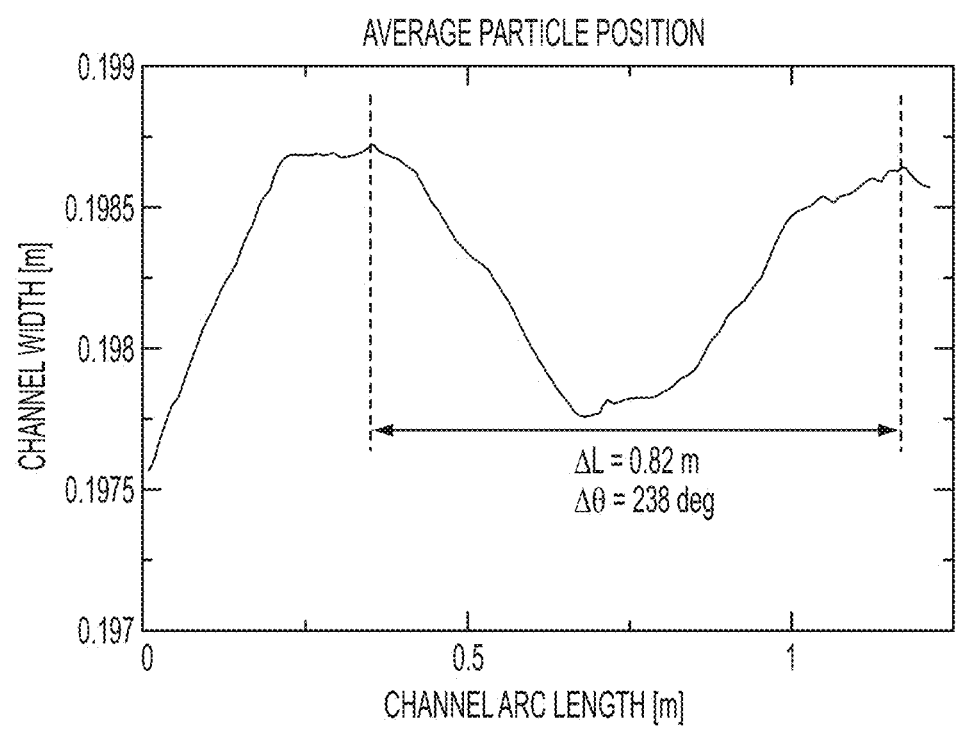
FIG. 11 shows CFD results

FIG. 11 shows the average radial position of small (non-focusing) particles as function of channel length for A=15 obtained through CFD simulations. The particles travel on average an arc length of about 238 deg while completing a full loop around the Dean vortex.

As summary of FIGS. 9 and 10 the test results using fluorescent beads in a channel with aspect ratio A=15 show the formation of a narrow band (≤20% of channel width). Though CFD simulations of non-focusing particles suggest an average arc length for particle travel while going around the vortex core is about 238 degrees, the experiments show that the band formation is already quite complete after an arc length of 180 degrees, indicating that all particles that come close to the outside wall are focusing at this location immediately. Because of the change in focusing behavior at the increased aspect ratio, channels can be operated at higher volumetric flow rate and achieve similar efficiency without changing the total channel length.

It will be appreciated that many advantages are realized when using channels with larger aspect ratio. One reason these advantages can be realized is because effective particle separation cut-off size is mainly determined by the height of the channel, not width. Thus, making the channel wider (thus higher aspect ratio), while maintaining the channel height and average flow speed, allows for increased volumetric flow rate per channel without significantly modifying the Dean and Reynolds numbers. Also, no significant increase of pressure head is required to operate the widened channel.

Another advantage is realized by increasing the channel aspect ratio which causes the particle band to form closer to the outside wall, allowing for a better clean stream to concentrate stream ratio.

Further advantages are realized by pushing the aspect ratio beyond about 7 which causes particle focusing during the first loop of the particles around the Dean vortex core. This allows high aspect ratio channel to have good separation with much shorter channel length than is possible for low aspect ratio channel, effectively reducing the energy needs for separation or the amount of materials required to construct the channels. On the other hand, more liquid can flow though the high aspect ratio channels per unit time, effective increasing the throughput.

In configuring devices according to the presently described embodiments, consideration should be given to several factors. For example, increasing the channel width increases the time (or the distance along the channel) for a particle to loop around the vortex core once, although the typical resident time for particles within the current channel scale (i.e. radius of curvature) are very short (on the order of 1-3 seconds, see Table 1). Further, increasing the aspect ratio beyond about 7 gives a large advantage in the channel length required to achieve good separation, because of the change in focusing dynamics. However, if increasing channel width beyond an aspect ratio of 7, the configurations may also take into account the optimization of channel length vs. flow rate per channel, which impacts footprint, cost of manufacturing, and maintenance of a multi-layer channel stack system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A hydrodynamic separation device comprising:
   an inlet for fluid containing particles;
   a curved channel having a width and height and being configured to receive the fluid, wherein an aspect ratio of the width to the height of the channel is at least 7;
   control elements including actuators configured to generate and maintain fluid flow such that the Dean number in the channel is between 30 and 100,
   wherein multiple pairs of Dean vortices are generated in the fluid and Dean vortices nearest an outer channel wall carry particles in a concentrated band through the channel as a function of the Dean number and the aspect ratio; and, an outlet configured to allow the concentrated stream to exit the channel on a first path and remaining fluid to exit the channel on a second path.

2. The device as set forth in claim 1 wherein the aspect ratio is 7.5.

3. The device as set forth in claim 1 wherein the aspect ratio is 15.

4. The device as set forth in claim 1 wherein the aspect ratio is between 8 and 15.

5. The device as set forth in claim 1 wherein the flow rate is adjusted such that the Dean number inside the channel is between 60 and 80.

6. The device as set forth in claim 1 wherein the aspect ratio is at least 15.

7. The system as set forth in claim 1 wherein the control elements or actuators comprise at least one of a control system, a pump, a valve, a user interface, a sensor and a variable frequency drive.

8. A method for hydrodynamic separation comprising:
receiving fluid containing particles in a curved channel having a width and height, wherein an aspect ratio of the width to the height of the channel is at least 7; and,
controlling the fluid in the channel using control elements having actuators such that the Dean number inside the channel is between 30 and 100 and to generate multiple pairs of Dean vortices in the fluid, wherein the Dean vortices nearest an outer channel wall carry particles in a concentrated band through the channel to an outlet configured to allow the concentrated stream to exit the channel on a first path and remaining fluid to exit the channel on a second path, as a function of the Dean number and aspect ratio.

9. The method as set forth in claim 8 wherein the aspect ratio is 7.5.

10. The method as set forth in claim 8 wherein the aspect ratio is 15.

11. The method as set forth in claim 8 wherein the aspect ratio is between 8 and 15.

12. The method as set forth in claim 8 wherein the flow rate is adjusted such that the Dean number inside the channel is between 60 and 80.

13. The method as set forth in claim 8 wherein the aspect ratio is at least 15.

14. The method as set forth in claim 8 wherein the control elements or actuators comprise at least one of a control system, a pump, a valve, a user interface, a sensor and a variable frequency drive.

* * * * *